United States Patent [19]

Siekierski et al.

[11] Patent Number: 5,630,189

[45] Date of Patent: May 13, 1997

[54] EASY-LOADING CAMERA

[75] Inventors: Roger A. Siekierski, Webster; Charles W. Greene, Clarence Center, both of N.Y.

[73] Assignee: Eastman Kodak Company, Rochester, N.Y.

[21] Appl. No.: 626,865

[22] Filed: Apr. 3, 1996

[51] Int. Cl.$^6$ .............................. G03B 17/02; G03B 17/00
[52] U.S. Cl. ..................... 396/440; 396/535; 396/538
[58] Field of Search .................................. 396/535, 538, 396/440

[56] References Cited

U.S. PATENT DOCUMENTS

| | | | |
|---|---|---|---|
| 3,479,938 | 11/1969 | Winkler et al. | 95/11 |
| 4,530,582 | 7/1985 | Hara et al. | 354/206 |
| 4,685,790 | 8/1987 | Uematsu | 354/203 |
| 5,142,316 | 8/1992 | Tanii et al. | 354/212 |
| 5,313,240 | 5/1994 | Lyon et al. | 354/288 |
| 5,521,668 | 5/1996 | Ezawa | 354/203 |
| 5,546,148 | 8/1996 | Janson, Jr. | 354/203 |

*Primary Examiner*—Safet Metjahic
*Assistant Examiner*—Daniel Chapik
*Attorney, Agent, or Firm*—Roger A. Fields

[57] ABSTRACT

An easy loading camera comprising a cartridge receiving chamber for receiving a film cartridge with a protruding film leader, and a leader insertion slit beginning at the cartridge receiving chamber, is characterized by a leader guide supported in a guiding position within the cartridge receiving chamber to guide the protruding film leader into the leader insertion slit before the film cartridge is loaded into the chamber and to be moved to a retracted position to make room for the film cartridge when the film cartridge is loaded into the chamber. Preferably, the leader guide is located in its leader guiding position for the film cartridge to push the leader guide out of the way as the film cartridge is loaded into the cartridge receiving chamber.

5 Claims, 2 Drawing Sheets

EASY-LOADING CAMERA

FIELD OF THE INVENTION

The invention relates generally to the field of photography, and in particular to cameras. More specifically, the invention relates to camera that is designed to make it easier for the photographer load a film cartridge into the camera.

BACKGROUND OF THE INVENTION

When a loading a conventional camera with a film cartridge having a film leader protruding from the cartridge housing, a rear door of the camera body is widely opened to expose the rear interior of the camera body including a cartridge receiving chamber, a backframe opening and a film take-up chamber. Then, the film cartridge with the protruding film leader held straightened is inserted into the cartridge receiving chamber, and the straightened leader is placed flat over the backframe opening and in the film take-up chamber. Then, the rear door is closed.

In contrast, U.S. Pat. No. 5,142,316, issued Aug. 25, 1992, discloses an easy loading camera including a cartridge holder that is pivoted out from a cartridge receiving chamber in the camera body to permit a film cartridge to be inserted endwise into the cartridge holder. The film cartridge is different than the typical one in that the film leader does not protrude from the cartridge housing. To load the easy loading camera, the film cartridge is placed in the cartridge holder and the cartridge holder is returned to the cartridge receiving chamber in the camera body.

Then, a film spool inside the cartridge housing is rotated via a camera mechanism to advance the film leader outwardly through a light-trapping slit in the cartridge housing and inwardly through an adjacent slit beginning at the cartridge receiving chamber to a film take-up chamber in the camera body.

Conversely, U.S. Pat. No. 5,313,240, issued May 17, 1994, discloses a single-use camera including a light-trapping slit beginning at a cartridge receiving chamber for a film cartridge having a film leader protruding from the cartridge housing. To load the single-use camera, it appears that the film leader is inserted inwardly through the light-trapping slit to the interior of the camera body and the film cartridge is placed in the cartridge receiving chamber. Then, a hollowed end cover is connected to the camera body to close the cartridge receiving chamber.

SUMMARY OF THE INVENTION

An easy loading camera comprising a cartridge receiving chamber for receiving a film cartridge with a protruding film leader, and a leader insertion slit beginning at the cartridge receiving chamber, is characterized by:

a leader guide supported in a guiding position within the cartridge receiving chamber to guide the protruding film leader into the leader insertion slit before the film cartridge is loaded into the chamber and to be moved to a retracted position to make room for the film cartridge when the film cartridge is loaded into the chamber.

Preferably, the leader guide is located in its leader guiding position for the film cartridge to push the leader guide out of the way as the film cartridge is loaded into the cartridge receiving chamber.

DETAILED DESCRIPTION OF THE INVENTION

The invention is disclosed as being embodied preferably in a camera to be used with a 35 mm film cartridge. Because the features of the camera and the film cartridge are generally known, the description which follows is directed in particular only to those elements forming part of or cooperating directly with the disclosed embodiment. It is to be understood, however, that other elements may take various forms known to a person of ordinary skill in the art.

Figure 1:
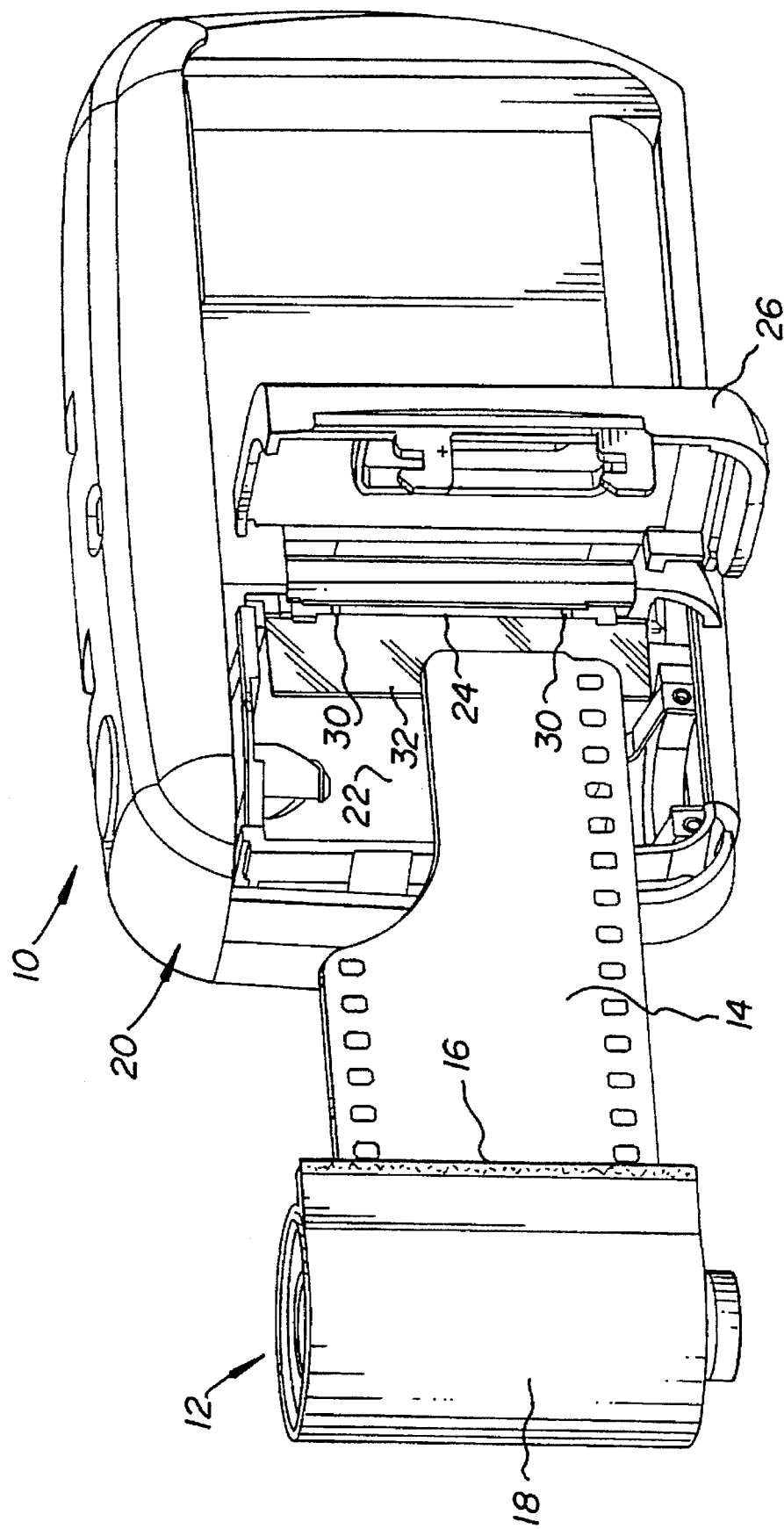
FIG. 1 is a rear perspective view of an easy loading camera according to a preferred embodiment of the invention, showing a rear door opened and a leader guide in a guiding position within a cartridge receiving chamber.
Figure 2:
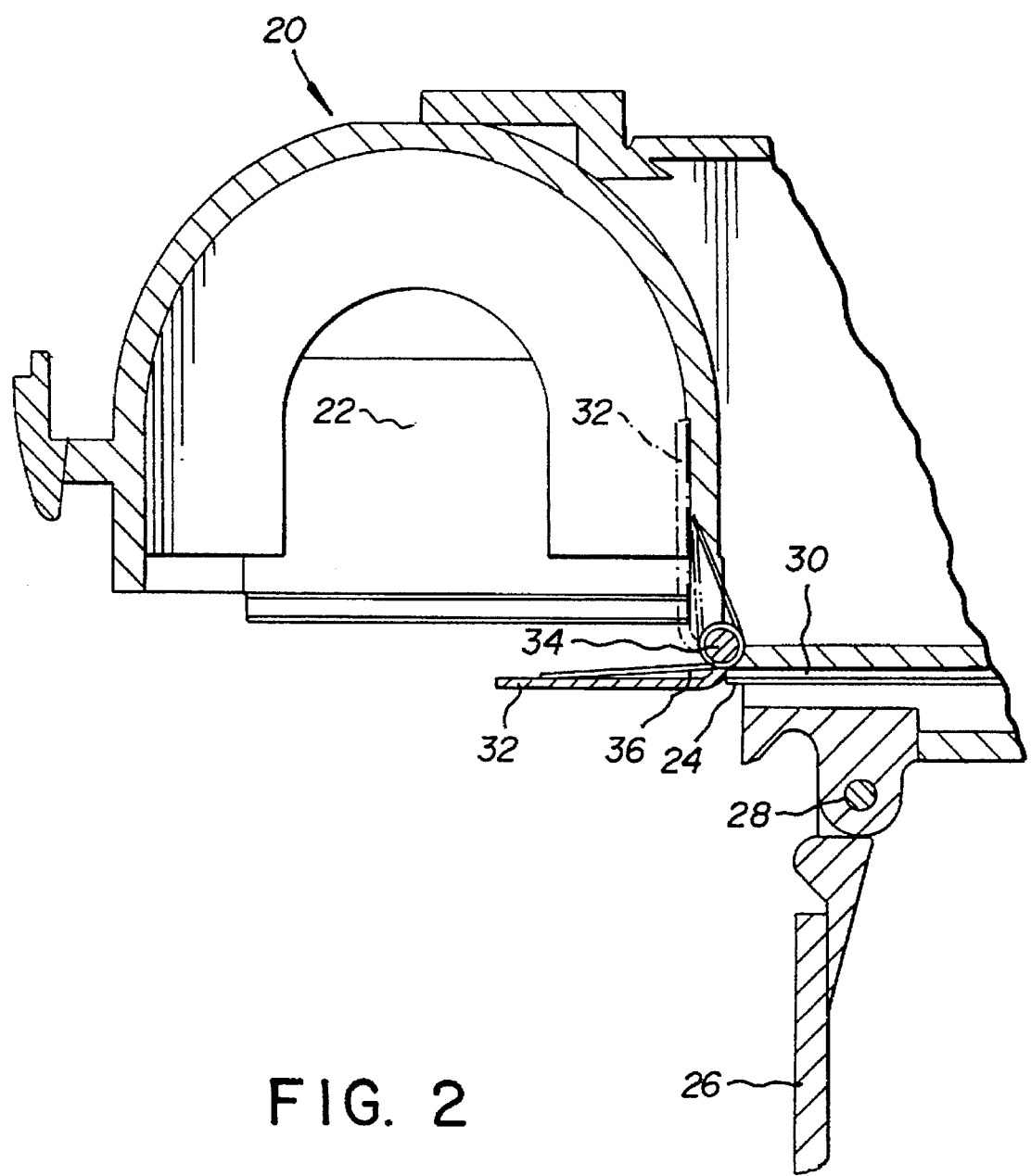
FIG. 2 is a sectional view of a portion of the easy loading camera, showing the leader guide in solid line in its guiding position and in broken line in a retracted position within the cartridge receiving chamber.

Referring now to the drawings, FIGS. 1 and 2 show an easy loading camera 10 to be used with a conventional 35 mm film cartridge 12. The film cartridge 12 has a film leader 14 that protrudes from a plush-lined light-trapping film exit slit 16 in the cartridge housing 18.

The easy loading camera 10 has a camera body 20 including a cartridge receiving chamber 22 and a plush-lined light-trapping leader insertion slit 24 beginning at the cartridge receiving chamber. The camera body 20 is sealed except for a rear door 26 that is supported on a pivot pin 28 to be opened to uncover 25 only the cartridge receiving chamber 22 and the leader insertion slit 24. A pair of parallel film rails 30 longitudinally extend from the sealed interior of the camera body 20 to the leader insertion slit 24.

A substantially flat leader guide 32 is supported on a pivot pin 34 in a guiding position within the cartridge receiving chamber 22, substantially coplanar with the pair of film rails 30, to guide the protruding film leader into the leader insertion slit 24 and initially onto the pair of film rails before the film cartridge 12 is loaded into the chamber and to be moved to a retracted position, shown in broken line in FIG. 2, to make room for the film cartridge when the film cartridge is loaded into the chamber. The leader guide 32 is located in its leader guiding position for the film cartridge 12 to push the leader guide out of the way as the film cartridge is loaded into said cartridge receiving chamber 22. A return spring 36, shown in FIG. 2, urges the leader guide 32 from its retracted position to its guiding position.

The invention has been described with reference to a preferred embodiment. However, it will be appreciated that variations and modifications can be effected by a person of ordinary skill in the art without departing from the scope of the invention.

PARTS LIST 10. easy loading camera
12. film cartridge
14. protruding film leader
16. film exit slit
18. cartridge housing
20. camera body
22. cartridge receiving chamber
24. leader insertion slit
26. rear door
28. pivot pin
30. pair of film rails
32. leader guide
34. pivot pin
36. return spring

We claim:

1. An easy loading camera comprising a cartridge receiving chamber for receiving a film cartridge with a protruding film leader, and a leader insertion slit beginning at said cartridge receiving chamber, is characterized by:

a leader guide supported in a guiding position within said cartridge receiving chamber to guide the protruding film leader into said leader insertion slit before the film cartridge is loaded into the chamber and to be moved to a retracted position to make room for the film cartridge when the film cartridge is loaded into the chamber.

2. An easy loading camera as recited in claim 1, wherein said leader guide is located in its leader guiding position for the film cartridge to push the leader guide out of the way as the film cartridge is loaded into said cartridge receiving chamber.

3. An easy loading camera as recited in claim 2, wherein a return spring urges said leader guide from its retracted position to its guiding position.

4. An easy loading camera as recited in claim 2, wherein a rear door is supported to be opened to uncover only said cartridge receiving chamber and said leader insertion slit.

5. An easy loading camera as recited in claim 1, wherein a pair of film rails longitudinally extend at least to said leader insertion slit, and said leader guide is located in its leader guiding position to direct the film leader onto said film rails.

* * * * *